US005689219A

United States Patent [19]

Piirainen

[11] Patent Number: 5,689,219

[45] Date of Patent: Nov. 18, 1997

[54] SUMMING NETWORK

[75] Inventor: Risto Piirainen, Oulu, Finland

[73] Assignee: Nokia Telecommunications Oy, Espoo, Finland

[21] Appl. No.: 596,298

[22] PCT Filed: Jun. 27, 1995

[86] PCT No.: PCT/FI95/00372

§ 371 Date: Feb. 13, 1996

§ 102(e) Date: Feb. 13, 1996

[87] PCT Pub. No.: WO96/00989

PCT Pub. Date: Jan. 11, 1996

[30] Foreign Application Priority Data

Jun. 30, 1994 [FI] Finland .................................... 943150

[51] Int. Cl.$^6$ .................................. H01P 5/12; H04B 1/02

[52] U.S. Cl. .......................... 333/127; 333/134; 333/136; 333/263; 455/103; 455/120

[58] Field of Search .......................... 333/17.3, 126–128, 333/223–225, 263, 129, 132, 134, 136; 455/103, 120–125

[56] References Cited

U.S. PATENT DOCUMENTS 2,774,044 12/1956 Silvey et al. ............................ 333/225
3,865,990 2/1975 Kuenemund ........................ 333/134 X
4,375,622 3/1983 Hollingsworth et al. ............... 333/126
4,580,108 4/1986 Barstow .................................... 331/96
4,667,172 5/1987 Longshore et al. ...................... 333/134
5,153,406 10/1992 Smith ................................ 219/121.43
5,202,649 4/1993 Kashiwa .................................... 333/33
5,235,294 8/1993 Ishikawa et al. ...................... 333/17.1
5,276,409 1/1994 Parikh et al. .......................... 333/17.1
5,430,417 7/1995 Martin et al. ........................ 333/263 X
5,440,281 8/1995 Wey et al. .............................. 333/126
5,457,812 10/1995 Siira et al. .......................... 455/103 X

FOREIGN PATENT DOCUMENTS 0 101 531 2/1984 European Pat. Off. .
0 262 391 4/1988 European Pat. Off. .
0 445 028 9/1991 European Pat. Off. .
0 494 058 7/1992 European Pat. Off. .
467 717 7/1946 Sweden .

*Primary Examiner*—Paul Gensler
*Attorney, Agent, or Firm*—Cushman Darby & Cushman Intellectual Property Group of Pillsbury Madison & Sutro LLP

[57] ABSTRACT

A summing network for combining and feeding radio frequency signals supplied by radio transmitters to common antenna means, includes conductors, connectors and a stub. In order to make the tuning of the summing network easier, the stub includes a changer for changing the electrical length of the summing network as a response to a control signal fed to the stub.

8 Claims, 1 Drawing Sheet

SUMMING NETWORK

This application claims benefit of international application PCT/FI95/00372, filed Jun. 27, 1995.

TECHNICAL FIELD

The present invention relates to a summing network for combining and feeding radio frequency signals supplied by radio transmitters to common antenna means, which summing network comprises conductors, connectors and a stub.

BACKGROUND OF THE INVENTION

The invention especially relates to a summing network of combiner filters of a base station in a cellular radio network. A combiner filter is a narrow-band filter which resonates exactly on the carrier frequency of a transmitter coupled to it. In the base station of a cellular radio system, for example, the signals obtained from the outputs of the combiners are combined by a summing network of a transmitting antenna, which summing network usually consists of a coaxial cable leading to the base station antenna, to which coaxial cable the combiner filters are usually coupled by T-branches.

In order that as much as possible of the transmitting power of the base station transmitters can be forwarded to the antenna (and not be reflected back to the transmitter), the summing network should be tuned with regard to frequency channels used by the transmitters of the base station. The summing network is optimally tuned (is in resonance), if the electrical length of its cables corresponds to a multifold of half the wavelength of the signal to be transmitted. Strictly speaking, a summing network is thereby tuned on one frequency only, but the mismatch does not at first increase very fast when the frequency changes away from the optimum. In practice, the summing network is usually optimized to approximately the centre of the frequency band of the base station, in which case the transmitting power of transmitters that operate at the edge of the frequency band can also be supplied to the base station antenna without significant losses.

In practice, however, the usable frequency band of a summing network is too narrow for the frequency channels of the base station transmitters to be changed very much without having to deal with the tuning of the summing network. So, need has arisen for a fast and simple adjustment of the tuning of the summing network.

A prior art solution is known for tuning a summing network, in which solution a stub is coupled to the summing network. Said stub is coupled to the last T-branch of the summing network in which case it connects to a connector which would otherwise be left Open. The stub contains a short-circuit screw which short-circuits the outer conductor and the centre conductor of a coaxial cable. The physical position of the short-circuit screw can be shifted within a certain adjusting range. The position of the short-circuit screw determines the electrical length of the stub, and thus of the summing network which consists of coaxial cable and connectors, i.e. the frequency to which the summing network is tuned.

The most serious weakness of the aforementioned, prior art, stub is the difficulty in adjusting it. The stub has to be adjusted manually by shifting the position of the short-circuit screw. The measure in question requires a visit by a service man to the site, which in turn takes a lot of time and increased costs.

SUMMARY OF THE INVENTION

The object of the present invention is to solve the aforementioned problem, and to provide a solution for making the tuning of a summing network easier. This object is achieved by a summing network of the invention characterized in that the stub comprises tuning means for changing the electrical length of the summing network as a response to a control signal fed to the stub.

The invention is based on the idea that the tuning of the summing network for a new frequency range is made considerably easier and faster as the stub is provided with tuning means for changing the electrical length of the summing network by means of a control signal fed to said stub. Thus, for example, the tuning of the summing network can be carried out by remote control without service personnel having to visit the location. The summing network of the invention is especially advantageous in a base station of a cellular radio network, which base station is employing automatically tunable combiner filters. A solution of this kind makes the service procedures required in the changing of the frequency channels of the base station considerably easier. Thus, easy and fast tunability is the most significant advantage of the summing network of the invention.

BRIEF DESCRIPTION OF THE DRAWINGS

In the following, the invention will be described in greater detail by means of a number of preferred embodiments of the summing network of the invention with reference to the accompanying drawings, in which.

DETAILED DESCRIPTION

Figure 1:
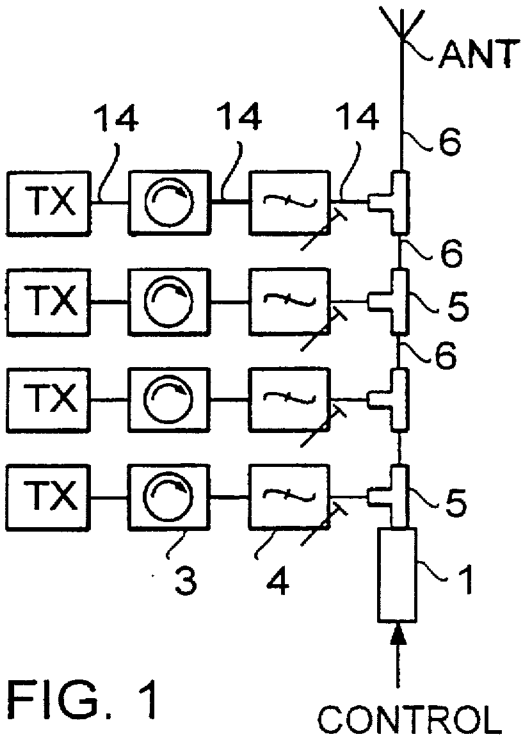
FIG. 1 shows a summing network of a base station.

FIG. 1 shows a summing network which can be, for example, that of a cellular radio system such as NMT (Nordisk Mobil Telefon), DCS (Digital Cellular System) or GSM (Groupe Spécial Mobile).

The summing network of FIG. 1 consists of coaxial cables 6 and T-branches 5. The coaxial cable from the upmost T-branch is coupled to the base station antenna ANT, and a stub 1 is connected to the connection of the lowest T-branch.

The base station of FIG. 1 comprises four radio transmitters TX. The radio frequency signals supplied by the transmitters TX are directed, via respective conductors 14, through circularors 3 and narrow-band combiner filters 4 to a summing network through respective T-branches 5. In order that as much as possible of the transmitting power of the base station transmitters is supplied to the antenna without being reflected back from points of mismatch, the electrical length of the cables 6 of the summing network must be one half of the wavelength of the carrier wave of the signal to be transmitted. Thus, the summing network is completely tuned (in resonance) on one frequency only, but the mismatch usually does not at first increase very fast when the frequency changes away from the optimum.

The combiner filters 4 of FIG. 1 are tunable, i.e. their frequency can be adjusted in a way known per se to correspond to the frequency channels used by transmitters TX. However, the adjustment/change of the frequency channels of the transmitters TX leads to the need for the summing network to be re-tuned to correspond to the new frequency channels. The tuning is carried out by the stub i of the invention, which stub, as a response to a control signal fed to it, changes the electrical length of the summing network.

A control signal can be supplied to the stub 1 of FIG. 1 so that, for example, a base station controller or a similar control unit feeds a control signal to the stub 1, which control signal indicates the centre position of the frequency channels of the base station. If the base station comprises means for measuring the power reflected back from the points of mismatch, the stub can be supplied with a control signal which is based on the power reflected back from the points of mismatch of those transmitters TX using the outermost frequency channels. Measuring means of this kind are already known in connection with automatically tunable combiner filters, and thus they are not dealt with in any greater detail here.

Figure 2:
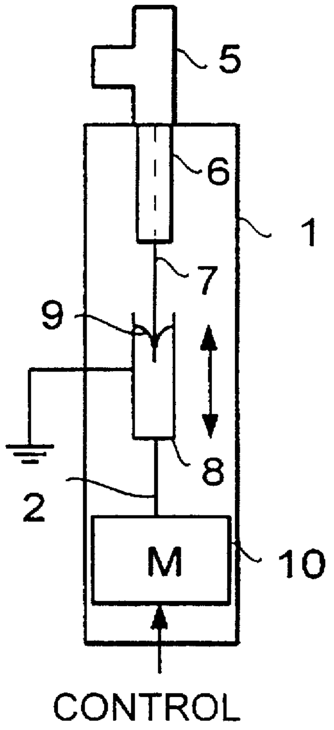
FIG. 2 shows a first preferred embodiment of the summing network of the invention.

FIG. 2 shows a first preferred embodiment of the summing network of the invention. FIG. 2 shows stub i of the summing network, and a T-branch 5 by which the stub 1 is connected to the summing network.

As FIG. 2 illustrates, the stub 1 includes a coaxial cable 6 whose centre conductor 7 is arranged to fit into a cylindrical grounding element 8. Slide contacts 9 are connected to the grounding element 8, which slide contacts are arranged to touch the centre conductor 7. In order to shift the contact point in question, the stub 1 comprises a transmission mechanism 2 and an electric motor 10 which, as a response to a control signal fed to it, moves the grounding element 8 and slide contacts 9 vertically in relation to the centre conductor 7, so that the contact point between the centre conductor 7 and the slide contacts 9 shifts, and, as a result, the electrical length of the summing network changes.

Figure 3:
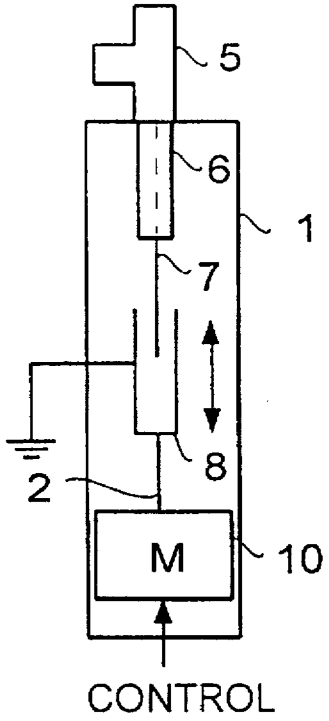
FIG. 3 shows a second preferred embodiment of the summing network of the invention.

FIG. 3 shows a second preferred embodiment of the invention. FIG. 3 to a great extent corresponds to the embodiment of FIG. 2 with the exception that in FIG. 3 there is no galvanic coupling between the centre conductor 7 and the grounding element 8. Thus, FIG. 3 shows a capacitive adjustment in which the electrical length of the summing network depends on how long a portion of the centre conductor 7 at a given moment goes into the cylindrical grounding element 8.

Figure 4:
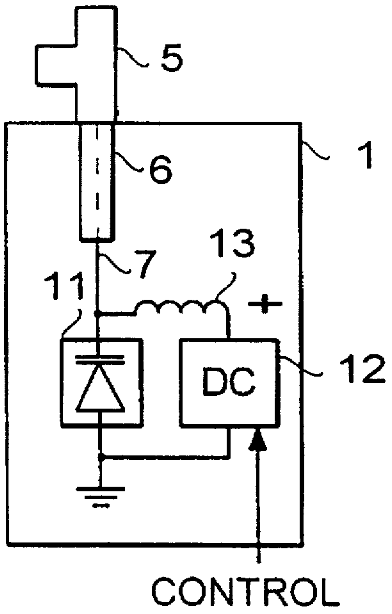
FIG. 4 shows a third preferred embodiment of the summing network of the invention.

FIG. 4 shows a third preferred embodiment of the invention. Similarly to the situation in FIG. 3, the change in the electrical length of the summing network in FIG. 4 is based on capacitive adjustment.

As shown by FIG. 4, the stub 1 is coupled to the T-branch 5 of the summing network by a coaxial cable 6. The centre conductor 7 of said coaxial cable is grounded by a capacitance diode 11. By an adjustable power source 12, a reverse direct voltage is obtained across the diode 11, and thus the capacitance of diode 11 is inversely proportional to the voltage level (an increasing voltage reduces capacitance). The choke 13 of FIG. 4 separates the power source 12 from the RF line.

It should be understood that the description above and the attached drawings are only meant to illustrate the present invention. Different kinds of variations and modifications will be obvious for a person skilled in the art without departing from the scope and spirit of the attached claims.

I claim:

1. A summing network for combining and feeding radio frequency signals supplied by a plurality of radio transmitters to common antenna means, said summing network comprising:

a plurality of radio transmitters and a common antenna means;

a corresponding plurality of conductors for receiving and forwarding radio frequency signals fed by respective ones of said radio transmitters;

a corresponding plurality of connectors; respective ones of said connectors being coupled to respective ones of said conductors, to said common antenna means, and in succession to each other, for receiving signals forwarded from said radio transmitters via said conductors and for forwarding such received signals to said common antenna means; and a stub which is connected to one of said connectors, said stub comprising adjusting means for changing the electrical length of the summing network as a response to a control signal fed to the stub.

2. A summing network as claimed in claim 1, further including:

a plurality of tunable filtering means having respective outputs;

each said radio transmitter being arranged to supply said radio frequency signals being forwarded, to respective ones of said tunable filter means having outputs, said conductors being connected to respective ones of said outputs of said tunable filtering means, for forwarding said radio frequency signals to said connectors.

3. A summing network as claimed in claim 1, wherein:

said connectors include a plurality of coaxial cables connected together in succession by T-branches, and said stub is mounted to one of said T-branches.

4. A summing network as claimed in claim 1, wherein:

said connectors and stub are connected to each other in succession by respective coaxial cables; and said adjusting means are arranged to change the electrical length of the summing network by shifting the grounding point of a centre conductor of a respective one of said coaxial cables connected with said stub.

5. A summing network as claimed in claim 1, wherein:

said connectors and stub are connected to each other in succession by respective coaxial cables; and said adjusting means comprise slide contacts each having one end arranged to have a contact with a centre conductor of a respective one of said coaxial cables connected with said stub, and another end grounded, and a transmission mechanism which comprises an electric motor for shifting the contact point between said slide contacts and said centre conductor as a response to said control signal.

6. A summing network as claimed in claim 1, wherein:

said connectors and stub are connected to each other in succession by respective coaxial cables;

an end portion of a centre conductor of a respective one of said coaxial cables connected with said stub is fitted in a cylindrical grounding element; and said adjusting means comprise a transmission mechanism which comprises an electric motor for moving said cylindrical grounding element so that the length of said end portion of said centre conductor that is fitted into said cylindrical grounding element changes.

7. A summing network as claimed in claim 1, wherein:

said connectors and stub are connected to each other in succession by respective coaxial cables; and a centre conductor of a respective one of said coaxial cables connected with said stub is grounded by a capacitive diode, across which diode a reverse direct voltage is arranged whose magnitude is responsive to said control signal for adjusting the electrical length of the summing network.

8. A summing network is claimed in claim 1, wherein:

said summing network is a summing network of transmission units in a base station of a cellular radio system.

* * * * *